Figure 1:
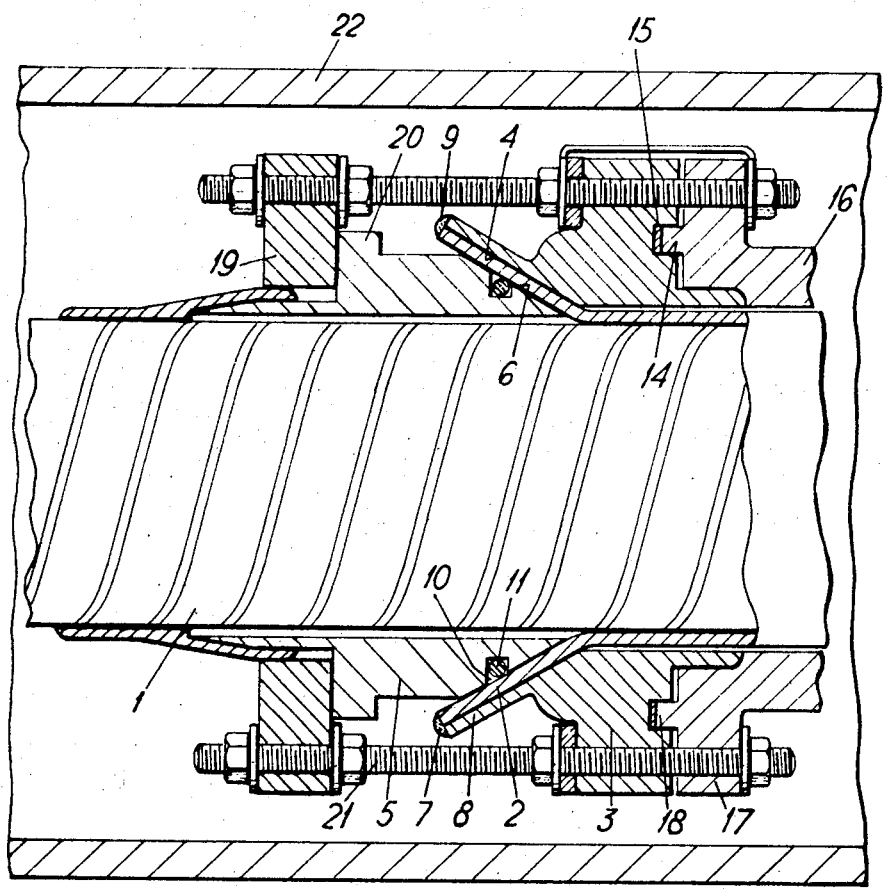

United States Patent [19]

Papadopulos et al.

[11] 3,744,130

[45] July 10, 1973

[54] METHODS OF JOINTING METAL PIPES AND OTHER METAL TUBULAR BODIES

[75] Inventors: Michael Savvas Papadopulos, Longfield, Kent; Peter Guilford, Erith, Kent, both of England

[73] Assignee: British Insulated Callender's Cables Limited, London, England

[22] Filed: Apr. 23, 1971

[21] Appl. No.: 136,817

[30] Foreign Application Priority Data
Apr. 24, 1970 Great Britain.................. 19,839/70

[52] U.S. Cl. ............................... 29/628, 174/21 R
[51] Int. Cl. ........................................... H01r 43/00
[58] Field of Search .................. 174/89, 21; 29/624, 29/493, 628

[56] References Cited
UNITED STATES PATENTS

| | | | |
|---|---|---|---|
| 1,771,738 | 7/1930 | Wise | 29/493 X |
| 1,881,160 | 10/1932 | Armacost | 29/493 X |
| 2,743,505 | 5/1956 | Hill | 174/21 R |
| 3,068,315 | 12/1962 | McGrath | 174/21 R |
| 2,012,443 | 8/1935 | Coe | 29/493 X |

FOREIGN PATENTS OR APPLICATIONS

| | | | |
|---|---|---|---|
| 1,008,201 | 4/1962 | Great Britain | 174/21 |
| 1,089,836 | 4/1958 | Germany | 174/89 |
| 1,097,000 | 1/1961 | Germany | 174/89 |

Primary Examiner—Charles W. Lanham
Assistant Examiner—James R. Duzan
Attorney—Webb, Burden, Robinson & Webb

[57] ABSTRACT

A fluid-tight joint between an end of a metal cable sheath and another metal body having a throughbore, for instance another metal cable sheath or a metal joint enclosure, is effected by shaping a length of the sheath adjacent the end in such a way that the extreme end of the sheath is radially spaced from the cable core. The metal body is arranged to embrace the shaped length and a second metal body is arranged to engage the inner surface of the shaped length in such a way that the extreme end of the sheath is exposed and lies close to an adjacent part of the first or each metal body. Molten metal is applied over the extreme end of the sheath and over said adjacent part of the first or each metal body, e.g. by welding, to form an adherent body of the metal. Preferably the area of the adjacent part of the first or each metal body is equal to the cross-sectional area of the extreme end of the sheath.

23 Claims, 4 Drawing Figures

Inventors:
MICHAEL SAVAS PAPADOPULOS
PETER GUILFORD

METHODS OF JOINTING METAL PIPES AND OTHER METAL TUBULAR BODIES

This invention relates to methods of jointing the sheaths of single or multi-core metal sheathed electric cables.

It is normal practice to effect a permanent fluid-tight connection between the ends of the sheaths of two metal sheathed electric cables or between the sheath of a metal sheathed electric cable and a metal joint enclosure by means of a plumbed joint. However, such joints are relatively weak in creep strength and with a view to providing a joint of greater creep strength it has been proposed to make a fluid-tight connection by means of a welded joint. The welded joint may be made by the arc welding techniques known as M.I.G. (Metal/inert gas) welding, which entails transfer of metal from an electrode to the work across an arc struck in an inert atmosphere, normally argon, or it may be made by the arc welding technique known as alternating current T.I.G. (tungsten/inert gas) welding, which entails heating the work to effect the weld by striking an arc to the workpiece from an electrode of tungsten, a rod of filler metal being fed into the area of the molten weld pool if required. It has been proposed to adopt these welding techniques in effecting a fluid-tight connection between an end of the sheath of a metal sheathed electric cable and another length of metal sheath or an end of a metal joint enclosure but where the metal sheath is of small radial thickness, for instance a thickness less than 5 mm (0.2 in), it has hitherto been thought necessary to employ a pulsed arc M.I.G. welding technique or an alternating or direct current T.I.G. welding technique because these more sophisticated techniques provide for close control of the accuracy, heat output and penetration of the weld, which is important where damage to the sheath or to the underlying parts of the cable core or cores is to be avoided. Whilst these sophisticated welding techniques are eminently suitable for this purpose the expertise and accuracy that they require in order to effect a satisfactory weld without burning a hole through the sheath and/or scorching or otherwise damaging the underlying parts of the core or cores are time consuming with the result that overall jointing costs of cable having thin metal sheaths can be high.

It is an object of the present invention to provide an improved method of effecting a fluid-tight joint between an end of a metal cable sheath and another metal body having a throughbore, which metal body may, for instance, be another length of metal sheath or a metal joint enclosure.

In accordance with the invention the method comprises so shaping a length of the metal sheath adjacent the end to be jointed that the extreme end of the sheath is radially spaced from the cable core or cores; arranging the metal body to embrace the shaped length of the sheath adjacent said end and a second metal body to engage the inner surface of the shaped length of sheath in such a way that the extreme end of the sheath is exposed and lies close to an adjacent part of the first metal body; and applying molten metal over the extreme end of the sheath and over said adjacent part of the first metal body to form an adherent body of the metal.

The extreme end of the sheath may be arranged to lie close to adjacent parts of both the first and second metal bodies and in this case the molten metal is preferably applied over the extreme end of the sheath and over said adjacent parts of the metal bodies.

Preferably the body of metal adheres to the extreme end of the sheath and to the adjacent part of the first metal body or to the adjacent parts of both metal bodies. Preferably also the body of molten metal is constituted at least in part by the adjacent part of the first metal body, or each of the adjacent parts of both metal bodies, the or each part being heated to an extent sufficient to ensure that it is molten and flows over and adheres to the extreme end of the sheath.

Where the sheath is to be jointed to another length of metal sheath the metal body engaging the inner surface of the shaped length of sheath will also have a throughbore and in all cases both bodies are preferably in the form of a metal collar, which may be longitudinally divided into two or more separable parts to facilitate positioning on or in a sheath.

The process of effecting a fluid-tight connection may be a soldering or brazing process but for high mechanical strength and reliability a welding process, such as the arc welding techniques known as M.I.G. welding or alternating current T.I.G. welding, is preferred.

Preferably the adjacent part of the first metal body, or each of the adjacent parts of both metal bodies, has an area that is equal or approximately equal to the cross-sectional area of the extreme end of the sheath thereby ensuring that the extreme end of the sheath and the adjacent part of the first metal body, or the adjacent parts of both metal bodies, are subjected to the same or approximately the same heat input during application of the molten metal. Where a welding process is employed the balanced heat input provides for an even weld with substantially equal penetration of both the sheath and the first metal body or both metal bodies.

The method of the present invention is especially, but not exclusively, suitable for use with cable sheaths of small radial thickness, for instance of aluminium or aluminium-based alloy, because it enables arc welding techniques to be employed that are less controllable than arc welding techniques hitherto used.

The two metal collars serve as means for positioning a welded connection remote from the cable core or cores and one or each collar also serves as a heat sink and thereby substantially reduces the risks of burning a hole in the sheath and/or of scorching or charring of those parts of the core or cores underlying the welded connection. Moreover, since the position of a welded connection is spaced from the underlying core or cores, the depth of weld penetration is not critical and a direct current M.I.G. welding technique or other welding technique can be used that is less controllable than the more sophisticated welding techniques usually employed with sheaths of small radial thickness, hence reducing the expertise required and the time spent in effecting the weld and the overall cost of the joint. It is to be understood, however, that the invention does not exclude the use of the more controllable welding techniques hereinbefore described, if desired.

The invention also includes a joint between a metal sheath and another metal body having a throughbore, and a joint between the sheaths of two lengths of metal sheathed cables, made by the method of the present invention and a cable joint in which a metal joint enclosure is connected at the joint at least in part by the method of the present invention.

In a cable joint in which at least one end of a metal joint enclosure is connected to the sheath of one of the cables connected at the joint by the method of the invention, the fluid-tight seal between an end of the sheath and one or each of the metal collars at the end of the sheath is preferably so located that it is surrounded by the joint enclosure and in this case the collar embracing the length of cable sheath adjacent the end at which the fluid-tight seal is formed will be directly or indirectly secured to the joint enclosure. Alternatively the fluid-tight seal at the end of the cable sheath may be located outside the joint enclosure and in this case the collar engaging the inner surface of the cable sheath will be directly or indirectly secured to the joint enclosure.

In all cases to reduce any tendency for thermomechanical forces acting on the sheath whilst the cable is on load causing the length of sheath to peel away from the collar embracing it thereby producing bending in the vicinity of the weld with consequential weakening of the welded connection, the two collars are preferably mechanically clamped together to reinforce the weld. Clamping is preferably effected by tie rods arranged around and extending between the collars.

Where the metal sheathed cable is a fluid-filled cable of the kind in which the insulation of the cable or cores is impregnated with a suitable insulating fluid, hereinafter referred to as an oil, it is essential to keep oil away from the area of the welded connection and for this purpose flow of oil between the inner surface of the shaped length of sheath and the adjacent surface of one of the collars is prevented by sealing means carried by the collar. The sealing means preferably takes the form of at least one O-ring of elastomeric material which is providing in a circumferential groove in the adjacent surface of the collar insulating and which makes a fluid-tight seal with the sheath, but other forms of sealing means may be used. The oil seal is only required to be effective prior to and during effecting of the welded connection and the fact that it may deteriorate as the result of heat from the weld is unimportant. insulating Both in the case where an oil-filled cable joint is a stop joint, that is a joint where two lengths of oil-filled cable are sectionalised hydraulically while provididng for their electrical continuity, and one or more than one preformed insultaing body that is to constitute the oil barrier is passed over an end of one of the cables before the joint is made, and in the case of a cable joint where preformed stress cones are passed over one or each cable before th joint is made, the shaping of the length of sheath adjacent a cable end and the radial thickness of the two metal collars will be such as to permit the preformed insultaing body or stress cones to be passed back over the joint after the welded connection has been made.

Figure 2:
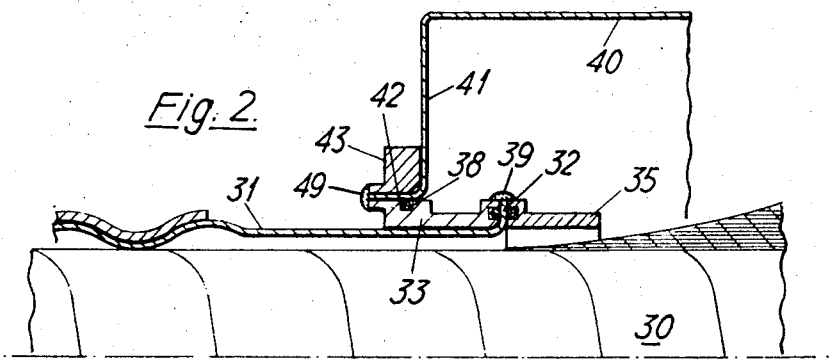
Figure 3:
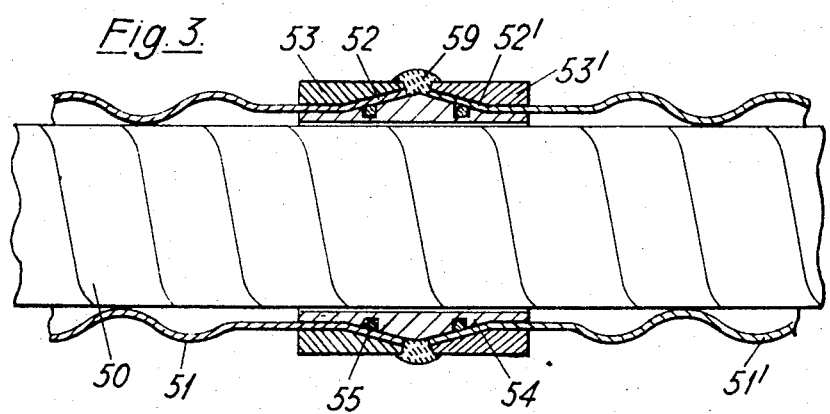
Figure 4:
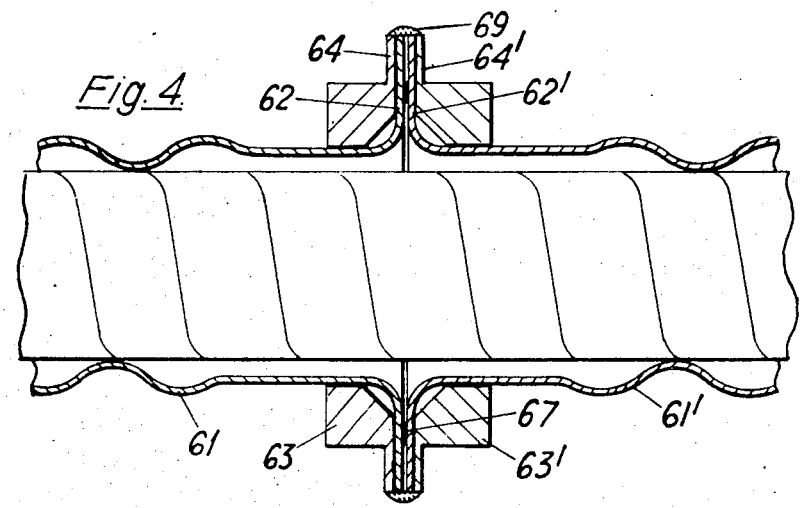

The invention will be further illustrated by a description, by way of example, with reference to the accompanying drawings, in which:

FIGS. 1 and 2 are fragmental side views, partly in section and partly in elevation, of two forms of fluid-tight connection between an end of an aluminium sheath of an oil filled cable and an end of a metal joint enclosure, and FIGS. 3 and 4 are fragmental diagrammatic side views, partly in section and partly in elevation, of two forms of fluid-tight connection between the ends of the aluminium sheaths of two lengths of oil filled cable.

Referring to FIG. 1, a length 2 of aluminium cable sheath adjacent the end of the sheath is so shaped that it makes an acute angle of approximately 30° with the axis of the cable core 1. A metal collar 3 having a frusto-conical surface 4 is arranged to embrace the shaped length 2 and the adjoining part of the sheath and a second metal collar 5 having a frusto-conical surface 6 is arranged to embrace the exposed cable core 1 and to engage the inner surface of the shaped length 2. The extreme end 7 of the shaped length 2 lies close to the end of an outwardly extending fin 8 integral with the collar 3, the cross-sectional areas of the extreme ends of the sheath and of the fin being substantially equal. A body 9 of metal formed by the M.I.G. welding technique overlies and adheres to the adjacent ends of the shaped length 2 and fin 8 and forms a fluid-tight seal between them. An O-ring 11 of elastomeric material is housed in a circumferential groove 10 in the frusto-conical surface 6 of the collar 5 and serves to keep oil from the interior of the cable from flowing between the collar and the sheath to the extreme ends of the sheath and fin prior to and during effecting of the welded connection.

The collar 3 has a annular groove 14 in its end wall which contains a sealing washer 15 and in which engages an annular rib 18 that projects from a flange 17 of a tubular metal body 16. An annular metal ring 19 engages a shoulder 20 on the collar 5 and, to reduce any tendency for the shaped length to peel away from the fin 8 due to thermomechanical forces to which the cable may be subjected when it is on load, the two collars are mechanically secured together by tie rods 21 passing through and secured to the flange 17, the collar 3 and the ring 19.

The tubular metal body 16 is secured in a fluid-tight manner to an end of the metal joint enclosure 22 by any suitable method (not shown) thereby completing a fluid-tight seal between the joint enclosure and the end of the shaped length 2 through the collar 3 and tubular body 16.

In the fluid-tight connection between an end of a cable sheath and an end of a metal joint enclosure shown diagrammatically in FIG. 2, the method of the present invention is employed to effect a fluid-tight seal both between the end of the sheath and the metal collars and a modification of the method is employed to effect a fluid-tight seal between one of the metal collars and the end of the joint enclosure. A length 32 of cable sheath 31 surrounding a core 30 adjacent the end of the sheath is so shaped that it forms a circumferentially continuous, radially outwardly extending flange. Two metal collars 33 and 35 having complementary radially extending surfaces are arranged on opposite sides of the shaped length 32, the surface of each collar engaging the shaped length having an annular groove in which is housed an O-ring of elastomeric material. The collars 33 and 35 are so shaped that a part of each collar adjacent the extreme end of the shaped length 32 has an area that approximates to the cross sectional area of the extreme end of the sheath. A body 39 of metal formed by the M.I.G. welding technique overlies and adheres to the extreme end of the sheath and the adjacent parts of the collars 33 and 35. The metal joint enclosure 40 has a radially extending annular end wall 41 which has at its radially inner edge a longitudinally extending lip which is located between the collar 33 and a metal collar 43. A part of each collar 33 and 43 adjacent the extreme end of the lip 42 has a cross sectional area approximating to that of the end of the lip and a body of molten metal 49 formed by the M.I.G. welding technique overlies and adheres to the adjacent parts of the collars 33 and 43. A part of the surface of the collar 33 that engages the lip 4w has a circumferential groove in which is housed an O-ring 38 of elastomeric material.

In the method of effecting a fluid-tight connection between two lengths of metal sheath as shown in FIG. 3 a length 52, 52' of each cable sheath 51, 51' adjacent the end to be jointed is so shaped that it makes an acute angle with the axis of the cable core 50. A single metal collar 54 of double frusto-conical form is arranged over the cable core 50 beneath the shaped lengths 52,52' on the sheath and two metal collars 53, 53' with frosto-conical inner surfaces are arranged to embrace the shaped lengths of the sheath in such a way that there is a narrow gap between the collars 53,53' and the extreme ends of the shaped lengths 52,52'. O-ring seals 55 are located in circumferential grooves in the frusto-conical surfaces of the collar 54. A welded connection 59 is effected across the exposed ends of the shaped lengths 52, 52' and across adjacent parts of the metal collars 53, 53' and 54 to form a fluid-tight connection.

FIG. 4 shows an alternative form of fluid-tight connection between the sheaths 61, 61' of two oil filled cables The length 62, 62' of each sheath adjacent the end to be connected is shaped to form a radially extending flange and the two flanges are positioned face to face with a sealing ring 67 of elastomeric material located between the two faces to prevent oil from reaching the vicinity of the welded connection. Two metal collars 63,63' having complementary radially extending surfaces are arranged on opposite sides of the two shaped lengths 62, 62' each collar having a radially extending fin 64, 64' adjacent the flanges which has an area approximating to the cross-sectional area of each shaped length 62, 62'. A welded connection 69 is effected across the extreme ends of the two shaped lengths 62, 62' and adjacent parts of the two fins 64, 64' to form a fluid-tight connection.

In addition to the advantages hereinbefore described, the method of the present invention provides a welded connection at an end of a joint enclosure, or between two metal sheaths, which can be simply disconnected by removing a radially outer portion of the first collar or each collar and hence the intervening welded connection. This may be done on site by effecting a circumferentially continuous cut across the collar or both collars by means of a cutting tool or milling tool. The fluid-tight connection may subsequently be reformed by the method of the present invention.

What we claim as our invention is:

1. A method of effecting a fluid-tight joint between an end of the sheath of a metal sheathed cable having at least one core and another metal body having a throughbore which comprises so shaping a length of the metal sheath adjacent the end to be jointed that the extreme end of the sheath is radially spaced from the cable core or cores; arranging the metal body to embrace the shaped length of the sheath adjacent said end and a second metal body to engage the inner surface of the shaped length of sheath in such a way that the extreme end of the sheath is exposed and lies close to an adjacent part of the first metal body; and applying molten metal over the extreme end of the sheath and over said adjacent part of the first metal body to form an adherent body of the metal.

2. A method of effecting a fluid-tight joint between an end of the sheath of a metal sheathed cable having at least one core and another metal body having a throughbore which comprises so shaping a length of the metal sheath adjacent the end to be jointed that the extreme end of the sheath is radially spaced from the cable core or cores; arranging the metal body to embrace the shaped length of the sheath adjacent said end and a second metal body to engage the inner surface of the shaped length of sheath in such a way that the extreme end of the sheath is exposed and lies close to an adjacent part of the first metal body, the area of the adjacent part of the first metal body being substantially equal to the cross-sectional area of the extreme end of the sheath; and applying molten metal over the extreme end of the sheath and over said adjacent part of the first metal body to form an adherent body of the metal.

3. A method as claimed in claim 1, wherein the body of metal adheres to the extreme end of the sheath and to the adjacent part of the first metal body.

4. A method as claimed in claim 1, wherein the body of molten metal is constituted at least in part by the adjacent part of the first metal body, the part being heated to an extent sufficient to ensure it is molten and flows over and adheres to the extreme end of the sheath.

5. A method as claimed in claim 1, wherein the metal body engaging the inner surface of the shaped length of sheath also has a throughbore.

6. A method as claimed in claim 1, wherein the two metal bodies comprise collars which have complementary surfaces and are located on opposite sides of the shaped length of sheath.

7. A method as claimed in claim 1, wherein the adherent body of metal is formed by a welding process.

8. A method as claimed in claim 7, wherein the welding process is an arc welding technique.

9. A method of effecting a fluid-tight joint between an end of the sheath of a metal sheathed cable having at least one core and a metal collar which comprises so shaping a length of the metal sheath adjacent the end to be jointed that the length lies at an acute angle to the axis of the cable with the extreme end of the sheath radially spaced from the cable core or cores; arranging the metal collar to embrace the sheath with the frusto-conical surface of an outwardly extending fin on the collar engaging the shaped length adjacent said end and a second metal collar to engage the inner surface of the shaped length of sheath in such a way that the extreme end of the sheath is exposed and lies close to an adjacent part of the fin of the first metal collar; and applying molten metal over the extreme end of the sheath and over said adjacent part of the fin to form an adherent body of the metal.

10. A method as claimed in claim 9, wherein the outwardly extending fin of the first collar has a cross-sectional area approximating to that of the sheath.

11. A method of effecting a fluid-tight joint between an end of the sheath of a metal sheathed cable having at least one core and another metal body having a throughbore which comprises so shaping a length of the metal sheath adjacent the end to be jointed that the extreme end of the sheath is radially spaced from the cable core or cores; arranging the metal body to embrace the shaped length of the sheath adjacent said end and a second metal body to engage the inner surface of the shaped length of sheath in such a way that the extreme end of the sheath is exposed and lies close to adjacent parts of both the first and second metal bodies; and applying molten metal over the extreme end of the sheath and over said adjacent parts of the two metal bodies to form an adherent body of the metal.

12. A method as claimed in claim 11, wherein the area of each of the adjacent parts of the two metal bodies is substantially equal to the cross-sectional area of the extreme end of the sheath.

13. A method as claimed in claim 11 in which the cable is an oil-filled cable, wherein the collar engaging the inner surface of the shaped length of sheath carries sealing means to prevent flow of oil between the inner surface of the shaped length of sheath and the engaging surface of the collar.

14. A method as claimed in claim 13, wherein the sealing means comprises at least one O-ring of elastomeric material housed in a circumferential groove in the surface of the collar that engages the inner surface of the shaped length of sheath.

15. A method of effecting a fluid-tight joint between ends of the sheaths of two metal sheathed cables each having at least one core which comprises so shaping a length of each metal sheath adjacent the end to be jointed that the extreme end of the sheath is radially spaced from the cable core or cores; arranging two metal bodies having a throughbore each to embrace a length of one sheath adjacent said end and at least one further metal body to engage the inner surfaces of said lengths of sheath in such a way that the extreme ends of the sheaths are exposed and lie close to adjacent parts of the first two metal bodies; and applying molten metal over the extreme ends of the sheaths and over said adjacent parts of the first two metal bodies to form an adherent body of metal.

16. A method as claimed in claim 15, in which each cable is an oil-filled cable, wherein the or each body engaging the inner surface of each shaped length of sheath carries sealing means to prevent flow of oil between the inner surface of the shaped length of sheath and the engaging surface of the body.

17. A method as claimed in claim 16, wherein the sealing means comprises at least one O-ring of elastomeric material housed in a circumferential groove in the surface of the body that engages the inner surface of the shaped length of sheath.

18. A fluid-tight joint between an end of the sheath of a metal sheathed cable having at least one core and another metal body having a throughbore, wherein a length of the metal sheath adjacent the jointed end of the sheath is so shaped that the extreme end of the sheath is radially spaced from the cable core or cores; the metal body embraces the shaped length of the sheath adjacent said end; a second metal body engages the inner surface of the shaped length of sheath; and an adherent body of metal overlies and is bonded to the extreme end of the sheath and an adjacent part of the first metal body.

19. A fluid-tight joint as claimed in claim 18, wherein the metal body having a throughbore is secured in a fluid-tight manner to a metal enclosure of an electric cable joint.

20. A fluid-tight joint as claimed in claim 19, wherein the joint enclosure surrounds the fluid-tight joint between the end of the metal cable sheath and the metal body.

21. A fluid-tight joint as claimed in claim 19, wherein the two metal bodies at the end of the cable sheath are mechanically clamped together to prevent relative movement between the two bodies.

22. A fluid-tight joint as claimed in claim 21, wherein a plurality of longitudinally extending tie rods clamp the two metal bodies against relative longitudinal movement.

23. A fluid-tight joint as claimed in claim 18, wherein the second metal body is an end of the sheath of a second metal sheathed cable.

* * * * *